United States Patent [19]

Faroudja

[11] 4,240,105

[45] Dec. 16, 1980

[54] METHOD AND APPARATUS FOR SEPARATION OF CHROMINANCE AND LUMINANCE WITH ADAPTIVE COMB FILTERING IN A QUADRATURE MODULATED COLOR TELEVISION SYSTEM

[75] Inventor: Yves C. Faroudja, 26595 Anacapa Dr., Los Altos Hills, Calif. 94022

[73] Assignee: Yves C. Faroudja, Los Altos Hills, Calif.

[21] Appl. No.: 68,215

[22] Filed: Aug. 20, 1979

[51] Int. Cl.³ .............................................. H04N 9/535
[52] U.S. Cl. ....................................................... 358/31
[58] Field of Search ...................... 358/31, 8, 37, 21 R

[56] References Cited

U.S. PATENT DOCUMENTS

| | | | |
|---|---|---|---|
| 3,542,945 | 11/1970 | Parker | 358/31 |
| 3,674,920 | 7/1972 | Faroudja | 358/31 |
| 4,050,084 | 9/1977 | Rossi | 358/31 |
| 4,072,984 | 2/1978 | Kaiser | 358/31 |
| 4,179,705 | 12/1979 | Faroudja | 358/31 |

OTHER PUBLICATIONS

"Comb Filter Improvement with Spurious Chroma Deletion", Kaiser, *SMPTE Journal,* vol. 86, No. 1, pp. 1-5, Jan. 1977.

*Primary Examiner*—Robert L. Griffin
*Assistant Examiner*—Michael Allen Masinick

*Attorney, Agent, or Firm*—Owen, Wickersham & Erickson

[57] ABSTRACT

An improved method and system for separating chrominance and luminance information in a quadrature modulated color television signal and similar periodic signals is disclosed. A comb filter selectively separates chrominance and luminance components from the video signal and provides a combed chrominance output and an adaptively combed luminance output. A low frequency luminance vertical transition detector is connected to an input and detects vertical amplitude transitions occurring at adjacent horizontal scanning lines and produces a first switching signal independent of the direction of a particular transition. A second transition detector detects the simultaneous occurrence of transitions in chrominance and high frequency luminance in either direction above predetermined minimum threshold values to provide a second switching signal. A subcarrier frequency-band reject filter in the luminance path, connected to be responsive to one or both of the first and second switching signals, selects subcarrier frequency band rejected luminance in lieu of combed luminance during an internal corresponding to one or both of the switching signals. The system may further or alternatively include a switch connected to switch to chrominance bandpass filtered video in lieu of combed chrominance during the interval of one or both of the first or second switching signals.

12 Claims, 2 Drawing Figures

METHOD AND APPARATUS FOR SEPARATION OF CHROMINANCE AND LUMINANCE WITH ADAPTIVE COMB FILTERING IN A QUADRATURE MODULATED COLOR TELEVISION SYSTEM

BACKGROUND OF THE INVENTION

The present invention relates to an improved method and apparatus for separating chrominance and luminance information in a quadrature modulated color television signal and similar periodically recurring signals. More particularly, the method and apparatus of the present invention effectively applies adaptive comb filtering techniques as well as vertical transition detection to a quadrature modulated subcarrier color television signal in order to provide improved separation of chrominance and luminance signal components during aperiodic transition states.

In consideration of designs for color television systems and signal formats, it has been recognized that the human eye does not require as much detailed chrominance (color hue and saturation) information as is required for luminance (brightness) information for the same apparent picture sharpness or resolution. Since the eye is extremely sensitive to brightness changes insofar as resolution is concerned, most television system signal formats, such as the National Television System Committee (NTSC) format, devote approximately 4 MHz of signal bandwidth to luminance information (the NTSC standard being 4.2 MHz). For color hue or saturation changes which are not accompanied by corresponding changes in luminance, the eye is satisfied with one-third to one-tenth the resolution needed for brightness. Thus, encoded color sub-carrier signals are accorded much less bandwidth than the bandwidth devoted to the luminance information. In the NTSC system, the I color subcarrier component has a 1.3 MHz bandwidth while the Q color subcarrier component occupies only 500 KHz. A consequence of bandwidth limitations upon color information subcarrier signals is that high frequency transitions, i.e., minute picture details, are monochrome, and that the color information applies only to larger picture details.

To reduce visible dot interference in the television picture, the NTSC color subcarrier frequency of 3.579545 MHz was chosen so that its sidebands are at odd multiples at half of the line scanning frequency. The result is that the color sidebands are interleaved between the high frequency sidebands of the luminance signals. Thus, successive dots or picture elements resulting directly from the subcarrier on one scanning line are offset and interleaved with dots on the next scanning line. The interleaved pattern of dots resulting from the subcarrier has heretofore been generally accepted by most viewers of black and white receivers as a noticeable, but usually unobjectionable, grid pattern within the picture.

Some of the reasons why the color subcarrier dot pattern have not been objected to or even perceived by the viewer are that the subcarrier is at a high frequency, so that the dots appear very close together and are not therefore objectionably visible at the normal viewing distance from the picture screen. As already noted, the dots are interleaved from one scanning line to the next, which further reduces their visibility at the normal viewing distance. Furthermore, most monochrome television receivers of domestic United States origin are characterized by a relatively low picture bandwidth and therefore will not even reproduce the dot pattern on the screen. Finally, since most information in a television picture is generally of low saturation and since it is rare to observe a fully saturated color image outside of a color bar test pattern, for example, the intensity of the dot pattern from the color subcarrier is not much greater than the ambient luminance levels upon which the subcarrier dot pattern rides. It has been found that the average color saturation of a television picture is around 20%. Thus, the brightness of a subcarrier dot rarely exceeds 20% of the ambient luminance present on the scanning line.

With pictures displayed on color television receivers, the interleaving of chrominance sidebands between luminance sidebands at the upper end of the luminance channel spectrum works well for static and low saturation color picture information, so long as chrominance levels do not exceed 20%. When high chrominance energy levels are present, the dot pattern levels in the luminance path are excessive, and combined with the high gamma of the picture tube, are shifting upwards the average brightness of saturated areas. As a result, for example, a high saturation red will be displayed on the color screen as a pinkish color. It is therefore mandatory, in a color television display, to filter out the subcarrier from the luminance channel prior to application to the display device.

The heretofore commonly employed expedient in color television receivers has been to install a band-reject filter (usually an LC trap) in the luminance path with a low end 3 db attenuation point being between 2.3 and 2.8 MHz. As a result, an incoming transition with 150 nanoseconds rise time will be degraded to 250 to 300 nanoseconds. Thus, it is appreciated that heretofore there has been a significant and continual loss of picture resolution in most color television receivers as a tradeoff for improved color purity. Also, the band-reject filter introduced ringing on trailing edges of high speed transitions and pulses such as those exemplified by the sine-square test pulse. Such ringing added additional visible artifacts to the picture which departed from the true image.

Another problem encountered when imperfect chrominance-luminance separation techniques were used resulted from the demodulation of high frequency luminance components, mistakenly detected as chrominance information by the television set demodulator. As a result fast luminance transitions were often followed by a rainbow pattern when a simple bandpass filter was used to remove luminance components from the chrominance channel.

Comb filters have been known to separate interleaved components in a complex spectrum with minimum degradations.

As early as 1930 in U.S. Pat. No. 1,769,920, F. Gray described the utilization of a comb filter design to enable interleaving two distinct television picture signals into a single spectrum corresponding to the audio frequency range.

With the advent of the NTSC color television signal format, in which the color subcarrier is interleaved between the high frequency sideband components of the luminance signal, it was proposed to employ the Gray filtering technique to the separation of chrominance and luminance signal information in a color television receiver. Gray's technique was noted in U.S. Pat.

No. 3,542,945 to N.W. Parker, issued Nov. 24, 1970. Parker implemented a form of comb filter by combining a bandpass filtered composite video signal (chroma with interspersed luminance components) in an adder with a second input to the adder being bandpassed video first having been passed through a one horizontal scanning line delay line and a phase inverter. Since two successive lines of NTSC chroma subcarrier are 180° out of phase by reference to horizontal synchronization pulses, the two inputs combined as a color subcarrier sum. Since lines of luminance are originally in phase, the combination of the oppositely phased luminance component inputs to the adder resulted in cancellation of luminance. Thus, a comb filtered chrominance output was provided in which luminance components had been phase cancelled. Parker's circuit then added the separated chrominance without further phase reversal to the composite video input signal (luminance plus chrominance). Phase cancellation of chrominance then occurred which provided a separated luminance output.

In static pictures having low chrominance levels, the Parker comb filter technique worked wall. However, for sudden color changes along a vertical axis and other dynamic changes in chrominance signals within the television picture, Parker's comb filter did not eliminate subcarrier dot patterns and other highly visible aberrations and artifacts deviating from the true picture on account of momentary phase shift and consequent loss of interleaving of the color signal within the upper frequency portion of the luminance signal. Another weakness of the Parker approach was the introduction of ringing and echoes in luminance transitions due to the imperfections of 1-line delay lines. Those errors were visible even when the comb filter was not required, that is, when the picture color saturation was low.

The usefulness of comb filtering in specialized television applications such as in time base error correction within color video recording and playback systems was disclosed in two of the present applicant's prior U.S. Pat. Nos. 3,674,920 issued July 4, 1972, and 3,764,739 issued Oct. 9, 1973.

In an article entitled "Comb Filter Improvements with Spurious Chroma Deletion," published in *SMPTE Journal* Vol. 86, No. 1, Jan. 1977, pages 1–5, Arthur Kaiser proposed a comb filter color decoder in which the comb filter was replaced during chroma transitions by a conventional low pass filter in the form of a trap. Kaiser's "adaptive" comb filter, while somewhat effective for its intended purpose, was not particularly effective during diagonal chroma transitions; and, implementation of Kaiser's circuitry as blocked out in FIG. 9 of his article, required two full bandwidth delay lines (4.2 MHz bandwidth modules which were then, and still are, very expensive). As a result, Kaiser's circuitry was practically limited to those situations, such as in television studios, where demanding video requirements may have justified the high cost of implementing his chrominance and luminance separation scheme. Another defect, known as "scalloping," was due to the presence of light vertical lines during chroma horizontal or oblical transitions, and was created by the use of two delay lines and perfect vertical alignment of chroma combing residues from line to line. Another exposition of the Kaiser technique is found in Kaiser's U.S. Pat. No. 4,072,984, issued Feb. 7, 1978. A significant difference between the Kaiser approach and applicant's approach is found in the fact that the Kaiser techniques do not use combed chrominance directly to control the switching of the low pass filter in and out of the luminance channel. Also, Kaiser does not teach or suggest that switching may validly be controlled by low frequency luminance transitions occurring in the vertical domain.

Another complex adaptive comb filtering technique for television signals is set forth in Rossi's U.S. Pat. No. 4,050,084, issued Sept. 20, 1977. Therein, Rossi's complex system does not use combed chrominance directly to control the switching in and out of the low pass filter and the luminance signal path. Also, the complexity of the Rossi switching approach involves a concept which is not capable of being implemented at low cost. Moreover, there was no teaching or suggestion in Rossi that the switching in of the low pass filter could be based on but a two line consideration, with only three choices: those being the main line component M; one-half the main line component minus the adjacent top line component, i.e., ½ M - T; or, zero, the third choice.

A low cost, highly effective adaptive comb filter method and apparatus was described in applicant's co-pending U.S. patent application, Ser. No. 886,164 filed Mar. 13, 1978 entitled "Method and Apparatus for Separation of Chrominance and Luminance with Adaptive Comb Filtering in a Quadrature Modulated Color Television System," now U.S. Pat. No. 4,179,705. While the system provided a vast improvement in adaptive comb filtering techniques over the prior art approaches, since the chroma processing therein was linear addition of two successive scanning lines of chroma information, there was a slight chroma fringing in the vertical dimension which became noticeable when electronic inserts or "keys" were made into the picture. Since half of the chroma information was delayed by one line, in the event of such electronic inserts or keys, the picture carried the illusion of a slight lack of chroma registration in the vertical dimension at such transitions in the picture. Thus, in some instances where electronic inserts and keys are made in the program material on a frequent basis, a need has arisen adaptively to switch off chroma combing at the transition of the electronically inserted material in the picture. Furthermore, it has been found that vertical chroma transitions are generally accompanied by luminance vertical transitions. Low frequency luminance vertical transition therefore provides a very reliable source of information to generate switching signals in order to switch off chroma combing or band-reject luminance information during chroma vertical transitions and effectively complement the mechanism described in U.S. patent application Ser. No. 886,164 in borderline cases of imperfect combing.

SOME OBJECTS OF THE INVENTION

A general object of the present invention is to provide improved comb filter separation of a quadrature modulated subcarrier signal from a signal modulating a main carrier in which the subcarrier has been interleaved in a portion of the spectrum thereof, and an improved concomitant removal of subcarrier vestiges from the main carrier signal via adaptive comb filtering responsive to transition states in both the vertical and horizontal dimensions.

Another object of the present invention is more effective elimination of color fringing artifacts at vertical transitions in a color television picture characterized by electronic inserts through adaptive comb filtering of chrominance and luminance information.

Yet another object of the present invention is to utilize a switching technique which applies comb filtering only when truly needed and which removes comb filtering from the chroma path and band-rejects the luminance path in order to eliminate unwanted artifacts in the picture, with switching thereof being in response to either low frequency luminance vertical transitions or simultaneous chrominance and luminance vertical transitions in the subcarrier frequency area.

Yet another object of the present invention is to utilize a switching technique which applies comb filtering to the picture when the saturation is above a predetermined level, in order to enable system implementation with low cost one-line delay lines and therefore to facilitate widespread adoption and use of comb filtering techniques at low prime manufacturing cost.

Another object of the present invention is to provide an improved adaptive comb filtering system which works equally well on NTSC or PAL color television signal formats.

Yet a further object of the present invention is to provide an improved adaptive comb filtering system for a quadrature modulated color television signal which is equally well suited to implementation with analog or digital circuitry.

SUMMARY OF THE INVENTION

An improved system for separating chrominance and luminance information in a quadrature modulated color television signal and similar periodic signals includes an input for receiving the quadrature modulated video signal. A comb filter selectively separates chrominance and luminance components from the video signal and provides a combed chrominance output and an adaptively combed luminance output. A low frequency luminance vertical transition detector is connected to the input and detects vertical amplitude transitions occurring at adjacent horizontal scanning lines and produces therefrom a first switching signal which is independent of the direction of a particular transition. A transition detector which detects the simultaneous occurrence of transitions in chrominance and high frequency luminance in either direction above predetermined minimum threshold values provides therefrom a second switching signal. A switched band-reject filter operating in the subcarrier frequency band is inserted in the luminance path is connected to be responsive to one or both of the first and second switching signals, selects band-reject filtered luminance in lieu of combed luminance during an interval corresponding to one or both of the switching signals. The system may further or alternatively include a bandpass filter connected to the input for selectively passing video components at the pass band of the chrominance sideband of the video signal and a switch connected to switch to the chrominance bandpass filtered video signal in lieu of combed chrominance during the interval of one or both of the first or second switching signals.

The improved method of the present invention comprises separating chrominance and luminance components in a quadrature modulated color television signal by the steps of comb filtering the signal to provide a combed chrominance output and a combed luminance output, detecting low frequency luminance vertical transitions occurring at adjacent horizontal scanning lines and thereby providing a first switching signal independent of transition direction, detecting simultaneous occurrence of chrominance and high frequency luminance vertical transitions in either direction above predetermined minimum threshold values for thereby providing a second switching signal, and selectivly switching a chroma frequency band-reject filter into the luminance path in lieu of full bandwidth combed luminance during an interval corresponding to one or both of the switching signals. The method may additionally or alternatively comprise bandpass filtering of the video signal to pass selectively chrominance and high frequency luminance components at the bandpass of the chrominance sideband and switching to band pass filtered video in the chrominance passband in lieu of combed chrominance during an interval corresponding to one or both of the switching signals.

These and other objects, advantages, features and characteristics of the present invention will now be discussed in more detail in the following detailed description of a preferred embodiment presented in conjunction with the accompanying drawings.

DETAILED DESCRIPTION OF A PREFERRED EMBODIMENT

Figure 1:
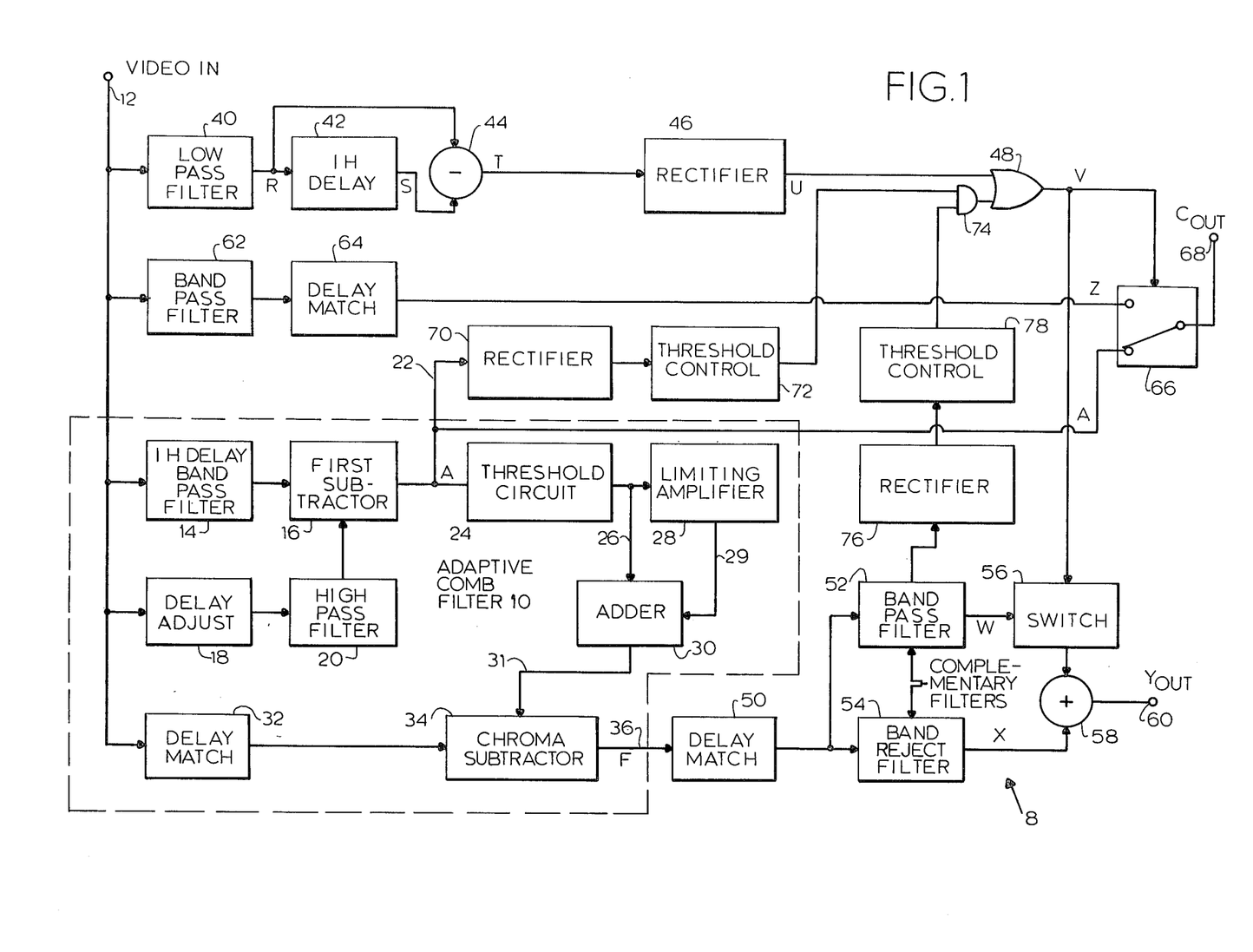
FIG. 1 is a block diagram of an improved comb filtered system for adaptively separating chrominance and luminance components of a quadrature modulated color television signal in accordance with the principles of the present invention.

An improved adaptive comb filtering system 8 in accordance with the principles of the present invention is shown in FIG. 1. Therein, an adaptive comb filter 10 provides an integral portion of the system 8. The comb filter 10 is essentially that disclosed and described in the FIG. 1 preferred embodiment of applicant's co-pending patent application Ser. No. 886,164 filed Mar. 13, 1978 for "A Method and Apparatus for Separation of Chrominance and Luminance with Adaptive Comb Filtering in a Quadrature Modulated Color Television System," now U.S. Pat. No. 4,179,705, reference to which is made for further particulars.

The system 8 includes an input 12. The input 12 receives a quadrature modulated color television signal from a source such as a video detector within a color television receiver (not shown). In the comb filter 10, the signal at the input 12 passes through a delay line 14 providing a delay of one horizontal scanning line (63.556 microseconds). The delay line 14 also functions as a bandpass filter having cutoff frequencies of about 2.5 MHz and 4.7 MHz. A low-cost, mass produced ultrasonic glass delay line, such as is commonly used in PAL or SECAM receivers, is ideally suited for implementing the delay line 14.

The 1-line-delayed and band-pass filtered output from the delay line 14 is passed to a subtractor circuit 16. At the same time, composite color video is passed from the input 12 through a delay adjustment circuit 18 and then through a high pass filter 20 so as to provide a second input to the subtractor circuit 16 which is not delayed by one scanning line. Thus, the signals provided to the subtractor 16 are timed to be in vertical picture alignment but are the period of one scanning line apart in time.

The delay adjustment circuit 18 adjusts the timing of the video passing therethrough so that the signals provided as inputs to the subtractor 16 are precisely one line apart in timing. The high pass filter 20 removes low frequency luminance information.

The first subtractor 16 subtracts the signals received from the delay line 14 and the high pass filter 20, and in so doing combines chroma components together additively (since the chroma components are oppositely phased with respect to one another). At the same time, the luminance components which are initially in-phase with respect to one another are cancelled in the subtractor 16. Therefore, an output line from 22 from the subtractor 16 provides a combed chroma output of the comb filter 10 in which static luminance components have been cancelled by operation of the subtractor 16, whereas the chrominance components have been summed by the same operation thereof.

When low cost, ultrasonic delay lines are used in the chroma path, the luminance cancellation will not be complete, because of imperfections of these lines. As a result, heavy luminance ringing following luminance transitions will be present in the chroma path, and, later on, in the combed luminance path if combed chroma is subtracted from the video without precaution. In the past, this problem was avoided by replacing low cost delay lines with high quality, expensive delay modules. The invention described in applicant's co-pending application, referred to above and incorporated by reference herein, took a different approach which eliminated such expensive modules.

Still within the adaptive comb filter 10, combed chroma from the output line 22 is applied to the input of a threshold amplifier circuit 24 which functions to amplify portions of the chroma signal which exceed a predetermined threshold amplitude set by the amplifier 24. An output line 26 from the threshold circuit 24 is connected to a limiting amplifier 28 and is also connected as an input to an adder circuit 30. The limiting amplifier 28 puts out an amplitude limited signal which has the same phase and polarity as portions above the threshold whenever the threshold circuit 24 puts out those portions of the combed chroma on the line 26. An output line 29 from the limiting amplifier 28 is connected to the adder 30. The adder circuit 30 combines the square wave pulses from the limiting amplifier 28 and the portions of the combed chroma put out by the threshold circuit 24 when it puts out chroma portions in excess of its threshold. Luminance residues which were present in the combed chroma output 22 (waveform A, FIG. 2) are eliminated at the output 31 of the adder 30 because they do not exceed the threshold level, while chroma above the threshold is not effected by the operations performed in the threshold circuit 24, the limiting amplifier 29 and the adder 30.

Still within the adaptive comb filter subsystem 10 composite color video from the input 12 is passed through a delay matching network 32 to a chroma subtractor circuit 34. The output 31 from the adder circuit 30 is also connected to the chroma subtractor circuit 34 and the signal thereon is subtracted from a properly delayed composite color signal from the delay matching circuit 32. The chroma subtractor 34 thus cancels chrominance components from the luminance signal whenever those chrominance components exceed the threshold level as established by the threshold circuit 24 of the comb filter 10. The delay matching circuit 32 delays the composite video signal from the input 12 so that it will be combined in the chroma subtractor 34 in appropriate time and phase relationship with the output from the adder circuit 30 so as to effectuate chroma cancellation.

The adaptive comb filter 10 illustrated within the broken line in FIG. 1 functions to switch on the luminance comb filter only when chroma is above the predetermined threshold level, preferably established at about 10 IRE units, chroma amplitude. Further discussion of the operation of the adaptive comb filter subsystem 10 may be found in applicant's co-pending patent application already identified and incorporated by reference above. Needless to say, the adaptive comb filter 10 provides a passively comb filtered chrominance output on line 22 and an adaptively comb filtered luminance output on line 36. These outputs are utilized in the improved system 8 in accordance with the present invention. Other elements of the system 8 will now be described.

A low frequency luminance vertical transition detector of the system 8 includes a low pass filter 40, a one-horizontal-line delay line 42, a subtractor 44, and a rectifier 46. The low pass filter 40 has an upper roll off frequency typically at 1.5 MHz although the frequency may be anywhere from 0.5 to 3 MHz. The upper frequency roll off cannot be above 3 MHz, however. The one horizontal line delay line 42 must have a sufficient pass band to handle the frequencies passed by the low pass filter 40. For example, if the low pass filter passes signals up to 500 KHz, the quality of the delay line 42 can be kept quite low and therefore its prime cost also is quite low.

It will be appreciated by those skilled in the art that the low pass filter 40 passes transition information in the vertical direction but not in the horizontal direction. The choice of the cutoff frequency determines the relative angle from vertical to horizontal of a transition that will be detected. The most favored approach is to make the cutoff frequency of the filter 40 approach 3 MHz to provide switching as fast as possible and therefore accommodate diagonal transitions. However, in practice the filter 40 has been made to work well with a cutoff frequency on the order of 1.5 MHz. The rectifier 46 eliminates the sign of the output of the subtractor circuit 44 and thus provides a unidirectional (absolute value) control signal representative of a vertical transition in either direction, that is, whether from a high amputide level to a low level, or from a low level to a high level.

The output from the rectifier 46 of the vertical transition detector section is applied to one input of a two input control logic OR gate 48 whose other connections and operation will be explained hereinafter. The adaptively combed luminance output 36 from the comb filter 10 is passed through a delay matching network 50 and thence through two complementary bandwidth filters: a bandpass filter 52, and a band-reject filter 54. The bandpass filter 52 has a bandpass characteristic suitable to pass the chroma subcarrier information and luminance information located in the subcarrier bandpass, while the band-reject filter 54 rejects the chroma pass band but passes lower frequency luminance components to an adder circuit 58. An electronic switch 56 which is controlled by the control output of the OR gate 48 normally connects the output of the bandpass filter 52 to the adder circuit 58. When a low frequency vertical transition is detected in either direction, the switch 56 opens and the chrominance bandpass components of the luminance signal are not combined in the adder circuit 58. Uncombed video in the chrominance pass band may additionally or alternatively be substituted in lieu of combed chrominance upon the detection of a vertical transition. The circuitry to facilitate this switching includes a bandpass filter 62 connected to the video input 12, an appropriate delay matching network 64 and another high speed electronic switch 66 which may also be controlled by the output from the OR gate 48. Normally, the switch 66 connects the combed chroma output line 22 to the chroma output line 68 to provide combed chrominance at the output 68 of the system 8. However, for the duration of a detected low frequency vertical transition, the swich 66 connects the output 68 to in-phase bandpass filtered composite video in the chrominance pass band.

The OR gate 48 may alternatively be activated by the simultaneous occurrence of chrominance transitions and high frequency luminance transitions which occur above predetermined thresholds. The logic required to accomplish this switching includes a rectifier 70 connected to the combed chrominance output line 22 and a threshold control circuit 72 which passes the transition-direction-independent chrominance information above a predetermined threshold (preferably about 10 IRE units) to one input of a two input AND gate 74. Another input to the AND gate 74 is connected from the bandpass filter 52 through a second rectifier 76 and a second threshold control circuit 78 (also set to operate above about 10 IRE units). The output of the AND gate 74 is connected as the second, alternative input to the OR gate 48. Thus upon simultaneous occurrence of chrominance transitions (above the threshold level set in the control 72) and high frequency luminance transitions (above the threshold set in the control circuit 78), the AND gate 74 operates the OR gate 48 and thereby toggles the switch 56 and also the switch 66.

To recapitulate the operation of the luminance filter switch 56, adaptively combed luminance from the filter 10 is provided at the luminance output 60 when there is no vertical luminance transition and there is no simultaneous occurrence of a transition in combed chrominance and high frequency combed luminance in the chrominance bandpass above predetermined thresholds. The switch 56 opens to limit the output 60 to lowpass filtered luminance during either vertical luminance transitions or simultaneous chrominance and luminance passband luminance transitions above predetermined thresholds. The chrominance switch 66 operates on the same conditions to provide bandpass filtered video at the chroma pass band in lieu of combed chroma during the same detected transition switching condition already described.

Figure 2:
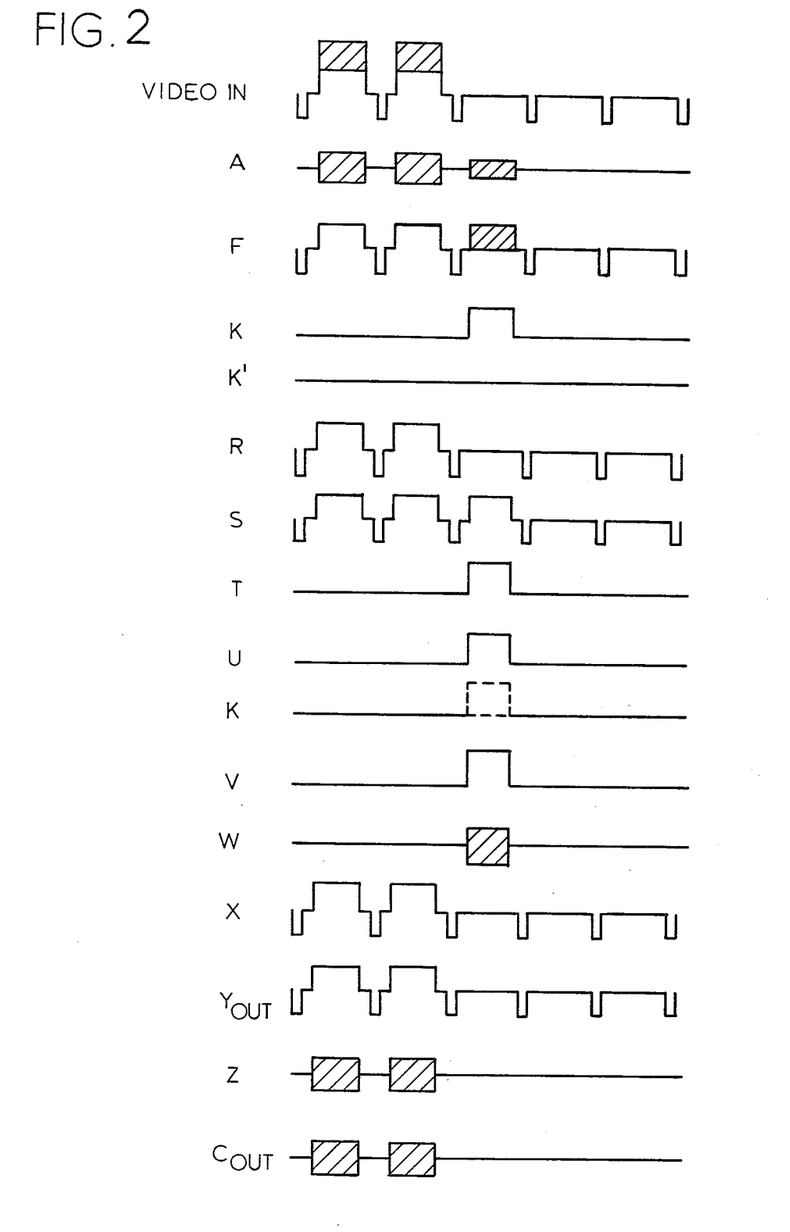
FIG. 2 is a set of time aligned waveform diagrams at various signal points of the system set forth in FIG. 1.

Further insight and understanding of the system 8 will be obtained from an examination of the FIG. 2 waveforms in conjunction with the FIG. 1 block diagram. The waveforms are graphic representations of horizontal lines of video-line-rate information at selected points throughout the system 8. Each waveform is depicted in the same time relationship as the others along the horizontal axis. The vertical axis represents signal amplitude. The lettering of waveforms is consistent with the lettering set forth in applicant's co-pending patent application, referred to above, now U.S. Pat. No. 4,179,705.

The "video in" waveform depicts two lines of color composite signal followed by three lines of no color information (black region in the picture display). The waveform A combed chroma signal on the line 22 reflects the presence of a residual chroma signal of one half original amplitude in the third scanning line. The waveform F combed luminance signal likewise has residual chrominance information in the third line, even though no chrominance was present in the first two scanning lines. It is this residual chroma signal in the luminance and chrominance paths which creates the undesirable appearance of color fringing, particularly in the event of electronic keying and video inserts. The present invention eliminates this undesirable picture artifact.

A switch pulse, waveform K, is provided at the output of the AND gate 74 in the third frame because of the simultaneous occurrence of combed chrominance above, e.g., 10 IRE units and chrominance in the luminance path above, e.g., 10 IRE units. If either signal had been below its predetermined threshold, then there would have been no switch pulse at the third line, a situation depicted by waveform K' of FIG. 2.

In the vertical transition detector circuit, the low pass filtered output of the filter 40 is depicted as waveform R, while the same signal after the one line delay 42 is waveform S. The output of the subtractor, waveform T, provides a second switch pulse which will be of either a positive or a negative amplitude, depending upon the direction of the detected transition. The output, waveform U, of the rectifier 46 assures that the second switch pulse is always of the same polarity and thus represents an absolute value of the magnitude of the pulse.

The output of the OR gate 48, waveform V, represents the switch control signal which operates the switches 56 and 66 during the period of its duration. Thus, the high frequency chrominance bandpass information, waveform W, is switched out of the luminance path, waveform Yout, with only low pass filtered luminance, waveform X, remaining at the luminance path output 60. Likewise, the switch 66 switches from combed chrominance, waveform A, to chrominance band pass filtered video, waveform Z, at the chrominance path output 68, waveform Cout.

While the apparatus and method of the present invention have been summarized and explicated by an illustrative application in adaptive comb filter processing of quadrature modulated color television signal components, it will be readily apparent to those skilled in the art that many widely varying embodiments and applications are within the teaching and scope of the present invention, and that the color television examples presented herein are by way of illustration only and should not be construed as limiting the scope of this invention.

I claim:

1. An improved system for separation of chrominance and luminance information in a quadrature modulated color television signal and similar periodically recurrent analog signals having interleaved, e.g., chrominance and luminance sidebands, said system comprising:
   an input;
   an output;
   comb filtering means connected to said input for selectively separating chrominance and luminance components from said signal and for providing a combed chrominance output and a combed luminance output;
   low frequency luminance vertical transition detector means connected to said input for detecting vertical amplitude transitions occurring at adjacent horizontal scanning lines and for thereby providing a first switching signal independent of transition direction;
   simultaneous chrominance and luminance transition detector means connected to said adaptive comb filtering means for detecting simultaneous chrominance and high frequency luminance transitions in either direction above predetermined minimum threshold values and for thereby providing a second switching signal;

switched low pass filter means selectively connected to said combed luminance output of said adaptive comb filtering means, said vertical transition detector means and said chrominance and luminance detector, and responsive to one or both of said first or second switching signals, for providing at said output chrominance frequency band band-reject filtered luminance in lieu of combed luminance during an interval corresponding to one or both of said switching signals.

2. An improved system for separation of chrominance and luminance information in a quadrature modulated color television signal and similar periodically recurrent analog signals having interleaved, e.g., chrominance and luminance sidebands, said system comprising:

an input;

an output;

adaptive comb filtering means connected to said input for selectively separating chrominance and luminance components from said signal and for providing a combed chrominance output and an adaptively combed luminance output;

low frequency luminance vertical transition detector means connected to said input for detecting vertical amplitude transitions occurring at adjacent horizontal scanning lines and for thereby providing a first switching signal independent of transition direction;

simultaneous chrominance and luminance transition detector means connected to said adaptive comb filtering means for detecting simultaneous chrominance and high frequency luminance transitions in either direction above predetermined minimum threshold values and for thereby providing a second switching signal;

switched chrominance frequency-band band-reject filter means selectively connected to said combed luminance output of said adaptive comb filtering means, said vertical transition detector means and said chrominance and luminance detector, and responsive to one or both of said first or second switching signals, for providing at said output band-reject filtered luminance in lieu of combed luminance during an interval corresponding to one or both of said switching signals.

3. The improved system set forth in claim 1 or claim 2 further comprising:

bandpass filtering means connected to said input for selectively passing chrominance and luminance components at the bandpass of said chrominance sideband;

switching means connected to switch between said bandpass filtering means and the combed chrominance output of said adaptive comb filtering means in response to one or both of said first or second switching signals so as to provide at said output bandpass filtered video at the bandpass of said chrominance sideband in lieu of combed chrominance during an interval corresponding to one or both of said switching signals.

4. An improved system for separation of chrominance and luminance information in a quadrature modulated color television signal and the like having interleaved chrominance and luminance sidebands, said system comprising:

an input;

an output;

adaptive comb filtering means connected to said input for selectively separating chrominance and luminance components from said signal and for providing a combed luminance output and a combed chrominance output;

low frequency luminance vertical transition detector means connected to said input for detecting vertical amplitude transitions occurring at adjacent horizontal scanning lines and for thereby providing a first switching signal independent of transition direction;

simultaneous chrominance and luminance transition detector means connected to said adaptive comb filtering means for detecting simultaneous chrominance and high frequency luminance transitions in either direction above predetermined minimum threshold values and for thereby providing a second switching signal;

bandpass filtering means connected to said input for selectively passing chrominance and luminance components at the bandpass of said chrominance sideband;

switching means connected to switch between said bandpass filtering means and the combed chrominance output of said adaptive comb filtering means in response to one or both of said first or second switching signals so as to provide at said output bandpass filtered video at the bandpass of said chrominance sideband in lieu of combed chrominance during an interval corresponding to one or both of said switching signals.

5. An improved method for separation of chrominance and luminance information in a quadrature modulated color television signal and similar periodically recurrent analog signals having interleaved, e.g., chrominance and luminance sidebands, said method comprising the steps of:

comb filtering said television signal to separate chrominance and luminance components from said signals and to provide a combed chrominance output and a combed luminance output;

detecting low frequency luminance vertical transitions occurring at adjacent horizontal scanning lines in said television signal to provide a first switching signal independent of transition direction;

detecting simultaneous chrominance and high frequency luminance transitions in either direction above predetermined minimum threshold values to provide a second switching signal;

band-reject filtering in the chrominance frequency band said combed luminance output and putting out band-reject filtered luminance in lieu of combed luminance during an interval corresponding to one or both of said switching signals.

6. An improved method for separation of chrominance and luminance information in a quadrature modulated color television signal and similar periodically recurrent analog signals having interleaved, e.g., chrominance and luminance sidebands, said method comprising the steps of:

adaptively comb filtering said television signal to separate chrominance and luminance components from said signal and to provide an adaptively combed chrominance output and an adaptively combed luminance output;

detecting low frequency luminance vertical transitions occuring at adjacent horizontal scanning lines in said television signal to provide a first switching signal independent of transition direction;

detecting simultaneous chrominance and high frequency luminance transitions in either direction above predetermined minimum threshold values to provide a second switching signal;

band-reject filtering in the chrominance frequency band said adaptively combed luminance output and putting out low pass filtered luminance in lieu of adaptively combed luminance during an interval corresponding to one or both of said switching signals.

7. The improved method set forth in claims 5 or 6 further comprising the steps of:

bandpass filtering said television signal to pass video components at the bandpass of said chrominance sideband, and switching between said bandpass filtered video and combed chrominance in response to one or both of said first or second switching signals and thereby providing at an output bandpass filtered video at the bandpass of said chrominance sideband in lieu of combed chrominance during an interval corresponding to one or both of said switching signals.

8. An improved method for separation of chrominance and luminance information in a quadrature modulated color television signal and the like having interleaved chrominance and luminance sidebands, said method comprising the steps of:

comb filtering said television signal to separate chrominance and luminance components and to provide a combed luminance output and a combed chrominance output;

detecting low frequency vertical amplitude transitions occurring at adjacent horizontal scanning lines and for thereby providing a first switching signal independent of transition direction;

detecting simultaneous chrominance and high frequency luminance transitions in either direction above predetermined minimum threshold values and for thereby providing a second switching signal;

bandpass filtering said television signal to pass video components at the bandpass of said chrominance sideband;

switching between said bandpass filtered video and combed chrominance in response to one or both of said first or second switching signals so as to put out bandpass filtered video at the pass band of said chrominance sideband in lieu of combed chrominance during an interval corresponding to one or both of said switching signals.

9. An improved system for separation of chrominance and luminance information in a quadrature modulated color television signal and similar periodically recurrent analog signals having interleaved, e.g., chrominance and luminance sidebands, said system comprising:

an input;
an output;
comb filtering means connected to said input for selectively separating chrominance and luminance components from said signal and for providing a combed chrominance output and a combed luminance output;

low frequency luminance vertical transition detector means connected to said input for detecting vertical amplitude transitions occurring at adjacent horizontal scanning lines and for thereby providing a switching signal independent of transition direction;

switched low pass filter means selectively connected to said combed luminance output of said adaptive comb filtering means and said vertical transition detector means and responsive to said switching signal, for providing at said output chrominance frequency band band-reject filtered luminance in lieu of combed luminance during an interval corrsponding to said switching signal.

10. An improved system for separation of chrominance and luminance information in a quadrature modulated color television signal and similar periodically recurrent analog signals having interleaved, e.g., chrominance and luminance sidebands, said system comprising:

an input;
an output;
adaptive comb filtering means connected to said input for selectively separating chrominance and luminance components from said signal and for providing a combed chrominance output and an adaptively combed luminance output;

low frequency luminance vertical transition detector means connected to said input for detecting vertical amplitude transitions occurring at adjacent horizontal scanning lines and for thereby providing a switching signal independent of transition direction;

switched chrominance frequency-band band-reject filter means selectively connected to said combed luminance output of said adaptive comb filtering means and said vertical transition detector means and responsive to said switching signal, for providing at said output band-reject filtered luminance in lieu of combed luminance during an interval corresponding to said switching signal.

11. The improved system set forth in claim 9 or claim 10 further comprising:

bandpass filtering means connected to said input for selectively passing chrominance and luminance components at the bandpass of said chrominance sideband;

switching means connected to switch between said bandpass filtering means and the combed chrominance output of said adaptive comb filtering means in response to said switching signal so as to provide at said output bandpass filtered video at the bandpass of said chrominance sideband in lieu of combed chrominance during an interval corresponding to said switching signal.

12. An improved system for separation of chrominance and luminance information in a quadrature modulated color television signal and the like having interleaved chrominance and luminance sidebands, said system comprising:

an input;
an output;
adaptive comb filtering means connected to said input for selectively separating chrominance and luminance components from said signal and for providing a combed luminance output and a combed chrominance output;

low frequency luminance vertical transition detector means connected to said input for detecting vertical amplitude transitions occurring at adjacent horizontal scanning lines and for thereby providing a switching signal independent of transition direction;

bandpass filtering means connected to said input for selectively passing chrominance and luminance components at the bandpass of said chrominance sideband;

switching means connected to switch between said bandpass filtering means and the combed chrominance output of said adaptive comb filtering means in response to said switching signal so as to provide at said output bandpass filtered video at the bandpass of said chrominance sideband in lieu of combed chrominance during an interval corresponding to said switching signal.

* * * * *